United States Patent
Haun et al.

(10) Patent No.: US 7,750,502 B1
(45) Date of Patent: Jul. 6, 2010

(54) PORTABLE WEATHER RESISTANT FLOW METER SYSTEM

(75) Inventors: Darrell N. Haun, Sugar Land, TX (US); Donald N. Haun, Stafford, TX (US)

(73) Assignee: Solarcraft, Inc., Stafford, TX (US)

( * ) Notice: Subject to any disclaimer, the term of this patent is extended or adjusted under 35 U.S.C. 154(b) by 0 days.

(21) Appl. No.: 12/396,984

(22) Filed: Mar. 3, 2009

(51) Int. Cl.
*H02J 9/00* (2006.01)

(52) U.S. Cl. .......................... 307/64; 307/66

(58) Field of Classification Search .................... 307/64, 307/66
See application file for complete search history.

(56) References Cited

U.S. PATENT DOCUMENTS

| | | | |
|---|---|---|---|
| 5,335,730 A * | 8/1994 | Cotham, III | 166/374 |
| 5,757,283 A * | 5/1998 | Janoska | 340/870.16 |
| 2003/0192675 A1 * | 10/2003 | Cosley et al. | 165/104.32 |
| 2006/0239777 A1 * | 10/2006 | Martin | 405/128.15 |
| 2007/0010916 A1 * | 1/2007 | Rodgers et al. | 700/295 |
| 2007/0171888 A1 * | 7/2007 | Adams | 370/346 |

* cited by examiner

*Primary Examiner*—Fritz M Fleming
(74) *Attorney, Agent, or Firm*—Buskop Law Group, PC; Wendy Buskop

(57) ABSTRACT

A portable, weather resistant flow control system with a flow controller contained within an enclosure that includes a rigid body preventing deformation of the enclosure during transport and a door with a seal providing proving protection from harsh weather and environmental conditions, where the system includes a power charger for powering a remote terminal, a wireless communication unit, and back up batteries.

10 Claims, 3 Drawing Sheets

PORTABLE WEATHER RESISTANT FLOW METER SYSTEM

FIELD

The present embodiments generally relate to a flow meter system that is tough, weather resistant and liftable without deformation for use in the field, particularly in harsh environments such as the Arctic or Saudi Arabia.

BACKGROUND

A need exists for a sturdy flow meter system that is factory built and pre-installed for immediate use in the field.

A further need exists for a highly reliable flow meter system with a remote terminal unit for easy and fast communication in the field without needing a lot of technical support crew in a hazardous environment.

The present embodiments meet these needs.

BRIEF DESCRIPTION OF THE DRAWINGS

The detailed description will be better understood in conjunction with the accompanying drawings as follows.

Figure 1:
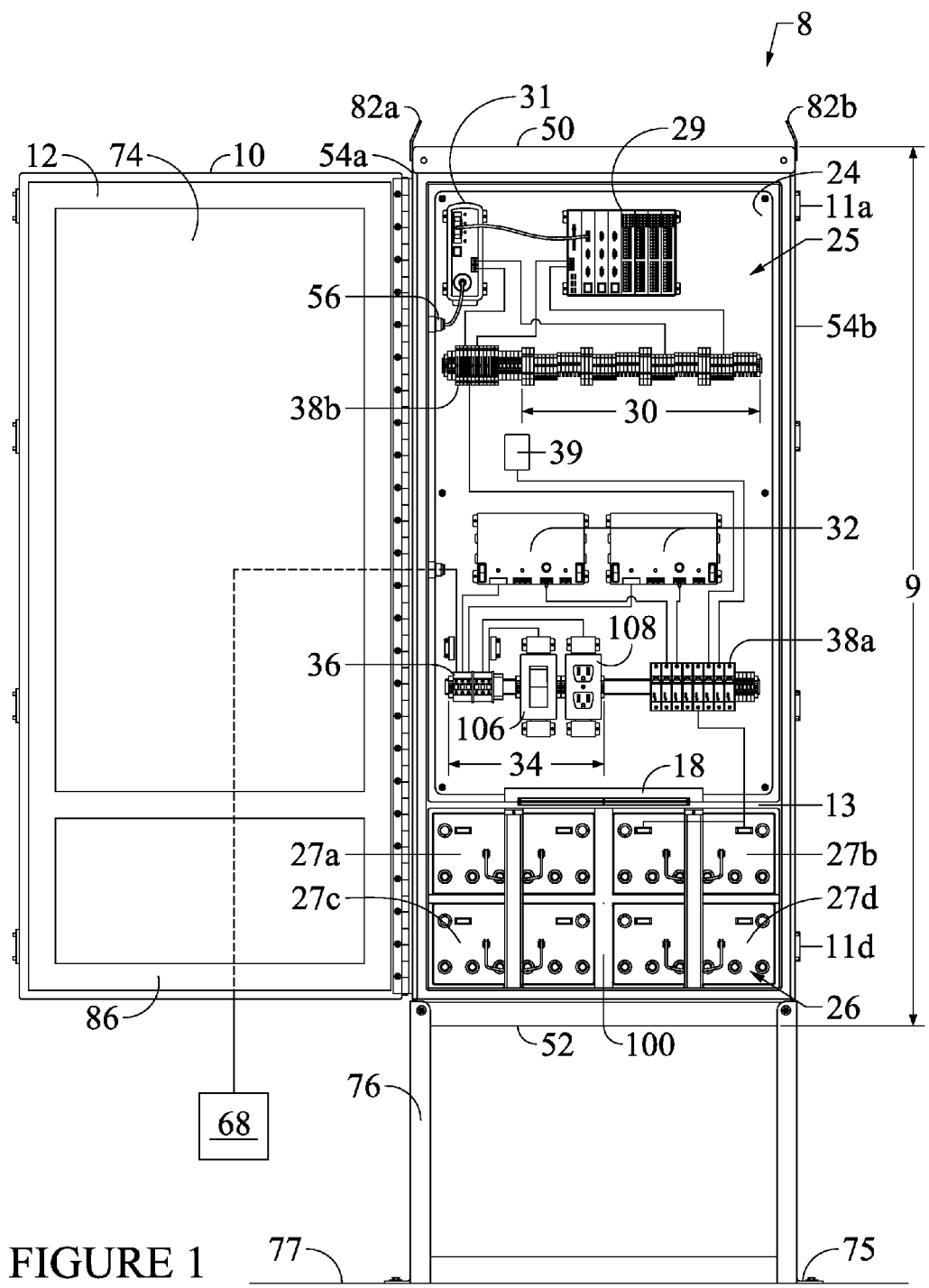
FIG. 1 illustrates a front view of a flow meter enclosure with the door open.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a portable weather resistant flow control system.

The system includes a flow control enclosure, which can be made from powder coated metal.

The flow control enclosure can have a body and a movable door that can be adapted to engage the body. The body can generally be a rectangular box with the movable door hinged to the body overlapping the walls of the rectangular box. The movable door can be removable from the body and attachable to the body with a plurality of fasteners, such as two fasteners, for two opposing walls.

The body that is square or rectangular can have five walls each having an outer side and an inner side. One of the walls forms a base.

The body can further be oval or circular in shape then only two or three walls would be used with one wall being for the bottom or base.

In an embodiment, at least one movable door fastener can be used to secure each wall to the movable door.

In one embodiment the body can be about 54 inches high, about 54 inches wide and about 28 inches deep. The body can be made from a power coated aluminum, which can have an aluminum thickness of between about ⅛ to about ⅜ inches.

The movable door can be the same height and width as the body, but can have an overhanging lip of up to several inches enabling the movable door to cover the open portion of the body and cover part of any wall that forms the portions of the body engaging the movable door. The movable door can be powder coated aluminum with an aluminum thickness of about ⅛ inches to about 3/16 inches.

The movable door can include a door extension for providing access to some components within the enclosure without requiring the movable door to be unlatched exposing every element to a potentially harsh environment.

A seal such as a rubber gasket that can have about a width of about 1 inch, a thickness of about 0.25 inches and can be fastened to the movable door to provide a weather tight sealing engagement with the body, so that no water, steam, sand or other undesirable materials get inside the enclosure.

A flow controller can be positioned within the door extension, but can also be disposed within the body. An example of a flow controller can be a unit available from Daniels™ of Houston, Tex. or a unit available from Fisher Scientific.

A remote terminal unit "RTU" monitoring controller can also be disposed in the door extension. In one embodiment the RTU monitoring controller can include a voltmeter for determining the voltage generated by a solar array.

The flow controller can be positioned on a back plane and can further be bolted to the plane. Parts of the flow controller can be removed from the back plane for repair if needed.

The back plane can be removably secured to the body of the enclosure and can be secured to the back of the enclosure.

A pedestal can be used for maintaining the flow control enclosure above a surface such as the ground, in case of flooding so none of the tanks or equipment are exposed to drifting sands, flood waters or other elements including wildlife.

A first lifting eye can be riveted, welded or bolted to a first wall of the body and a second lifting eye can be similarly connected to a second wall opposite the first lifting eye. This configuration can enable a crane, such as a pedestal crane to lift the portable weather resistant flow control system with all the equipment mounted in it without deforming the flow control enclosure. Non-deforming lifting of such heavy and calibrated equipment without damage is an amazing feat and is needed in the field.

In another embodiment, a flange can be riveted, welded or bolted to one of the walls. The flange can encircle the walls, like a small frame on top of the body. The flange can also be used to support the first and second lifting eyes. The flange can also have lifting holes drilled in it for lifting of the portable weather resistant flow control system without the lifting eyes.

A foldable tray can be mounted to the body on the inside for supporting a computer. The foldable computer tray can be sized to accommodate portable computing devices such as lap tops. The foldable tray can fold out from the body providing a unique space saving feature.

The system can provide continuous low voltage power to other field sources from an A/C power source. If the AC source fails, the system can continue to operate using the batteries for at least about 48 hours.

Turning now to the Figures, FIG. 1 depicts a portable self contained weather resistant low voltage flow control system having an flow control enclosure 8 including a body 9 with a movable door 10 mounted atop a pedestal 76. The pedestal 76 can include pedestal flanges 75 for mounting the flow control enclosure on a surface 77. The movable door 10 is illustrated in the open position, but can be closed and secured with movable door fasteners 11a, 11b, 11c, 11d. A seal 12 can be located on the inner side of the movable door 10, which can provide a means for keeping elements such as sand and rainwater out of the interior of the flow control enclosure 8.

The body 9 can includes a top 50, a bottom 52 and sides 54a, 54b. Each of the top 50, bottom 52 and sides 54a, 54b can be covered completely or partially with insulation 74.

A bulkhead 13 can be disposed in the body 9 forming a top compartment 25 and a bottom compartment 26. At least two batteries 27a, 27b can be disposed within bottom compartment 26. Batteries 27a, 27b, 27c, 27d are shown stored in the bottom compartment 26 and can fit into respective spaces formed by separator 100. The bottom compartment 26 can be sealed by bottom seal 86 on the movable door 10.

A back plane 24 can be mounted to at least the bulkhead 13 within the top compartment 25 for supporting electronics equipment.

The flow control system can provide about 12 volts to about 24 volts of power continuously to the remote terminal unit 29 and the wireless communication unit 31 while providing continuous communication for at least intermittent monitoring of field equipment.

An input/output (I/O) termination assembly 30 can be mounted to the back plane 34, wherein the IO termination assembly 30 can provide connections for at least one piece of field equipment to a remote terminal unit 29. The connected piece of field equipment can provide measurements or data for storage on the remote terminal unit 29 and transmission by the wireless communications unit 31.

The wireless communications unit 31 can be mounted to the back plane 24 and can be connected to the wireless communication unit 31. The wireless communication unit 31 can take data from the remote terminal unit 29 and transmits that data, via radio frequencies, to receivers located remotely from the flow control enclosure 8.

An A/C terminal assembly 34 can be connected to an external A/C power source 68 through a surge protector 36 in order to protect the A/C terminal assembly 34 from power surges. The A/C terminal assembly 34 can further be mounted to the back plane 24 for receiving and distributing a continuous flow of A/C current from an A/C power source 68 to at least one uninterruptable power supply 32 (DC-UPS).

At least one uninterruptable power supply 32 can be mounted to the back plane 24 for providing between about 10 volts to about 30 volts of DC power to at least two batteries 27a, 27b. The uninterruptable power supply 32 can be connected to the batteries through a low voltage distribution block 38a.

The low voltage distribution block 38a can be mounted to the back plane 24 and can be in communication with a second low voltage distribution block 38b. The second low voltage distribution 38b block can provide power to the wireless communications unit 31 and the remote terminal unit 29.

A DC-DC converter 39 mounted to the back plane 24 can also communicate with the voltage distribution block 38a.

At least two removable lifting eyes 82a, 82b can be secured to the enclosure for lifting of the flow control enclosure 8 by a crane.

A foldable computer tray 18 can be located in the upper compartment 25 and can provide a means for supporting a portable computer such as a lap top.

FIG. 1 also shows a switch 106, which can be in communication with the AC terminal assembly 34 and the uninterruptable power supply 32 DC-UPS.

An outlet 108 is illustrated in communication with the AC terminal assembly 34. The outlet can be about a 110 volts to about a 220 volts outlet.

In another embodiment, the wireless communication unit 31, remote terminal unit 29, I/O termination assembly 30, the uninterruptable power supply 32, the A/C terminal assembly 34, the surge protector 36, the low voltage distribution block 38a and the converter 39 disposed on the back plane 24 can be in a sealed watertight, water resistant top compartment.

In another embodiment, a ground fault interrupter 56 can be disposed between the AC terminal assembly 34 and the uninterruptable power supply 32 DC-UPS.

Figure 2:
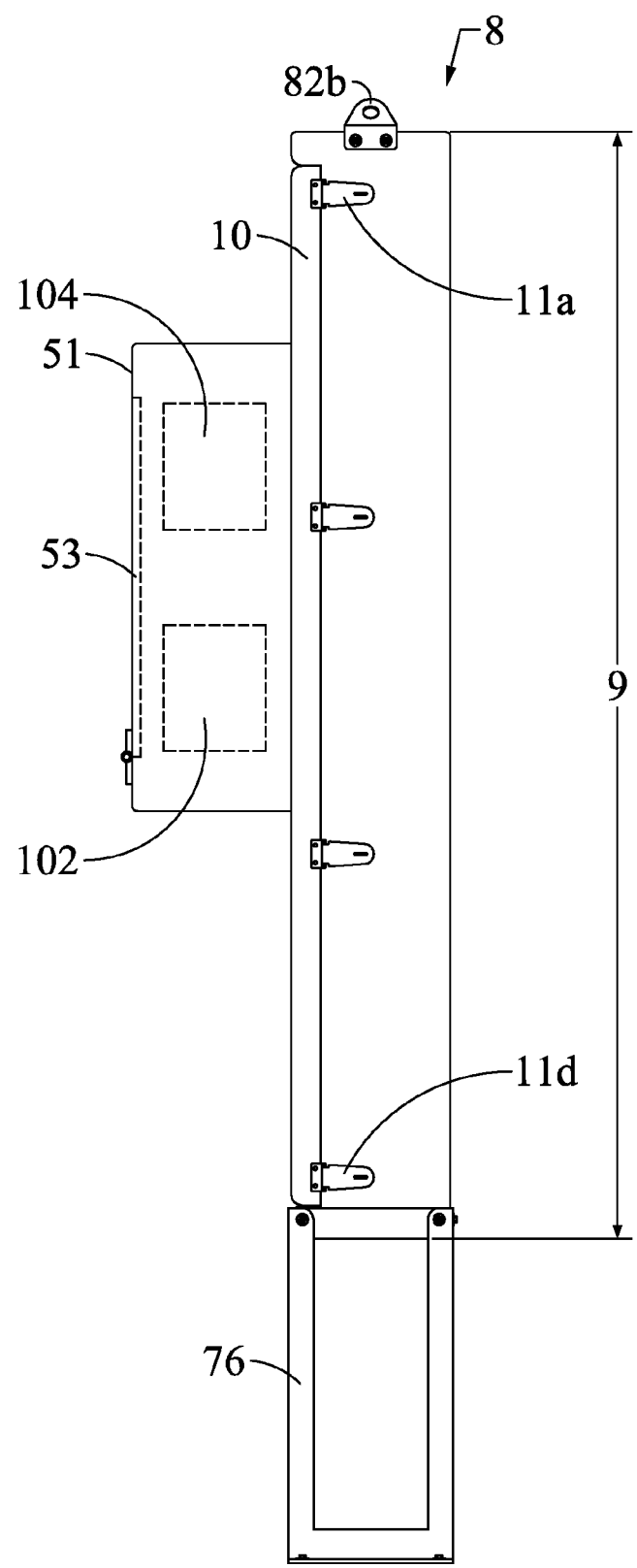
FIG. 2 illustrates a view of the door including a door extension in accordance with certain embodiments of the present invention.

FIG. 2 illustrates a side view of the flow control enclosure 8 with body 9 and movable door 10 in a closed position mounted on pedestal 76. A door extension 51 can be seen in the movable door 10. The door extension can include a viewing port 53. The viewing port 53 can further include a hinged surface which can provides access to the interior of the door extension. The movable door 10 can be attached to the body 9 of the flow control enclosure 8 with fasteners 11a, 11d, as shown in this Figure.

The door extension 51 can be adapted to house a remote terminal unit monitoring controller 102, such as one made by Bristol, which can be in communication with the remote terminal unit 29. The door extension 51 can also house a flow controller 104, such as Daniel 2358A or one made by Omni Products, Inc., which can be in communication with the A/C terminal assembly 34 and at least one piece of field equipment.

In an embodiment, the remote terminal unit monitoring controller 102 can further comprise a volt meter for tracking voltage produced by the solar array. An example of a volt meter can be a Morningstar Sunsaver 10 solar controller ss-10L-24 volt.

FIG. 2 also illustrates second lifting eye 82b, which can provide a balanced means for lifting and moving the flow control enclosure 8.

Figure 3:
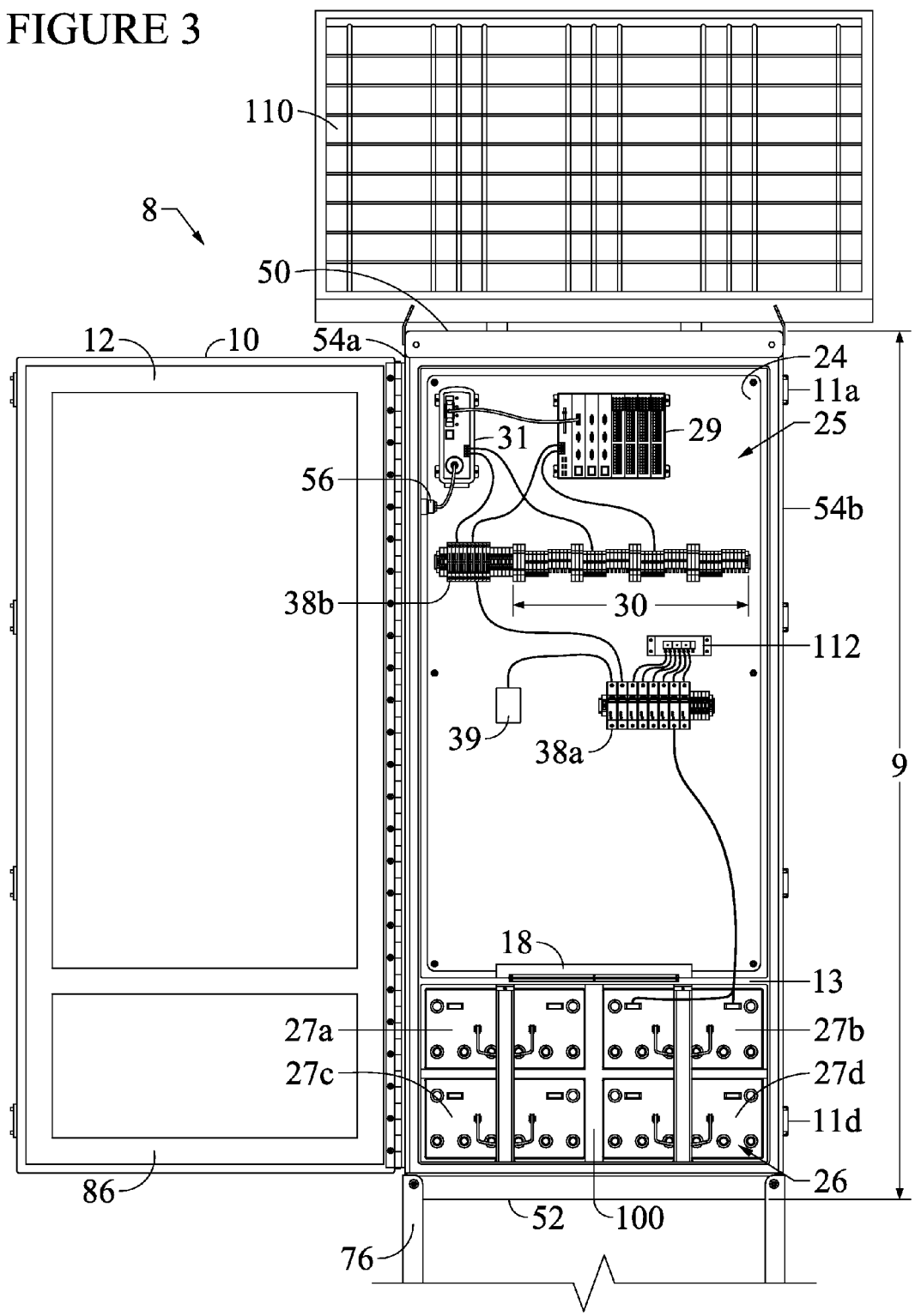
FIG. 3 illustrates a front view of on embodiment in accordance with the present invention including a solar array as a source of power.

FIG. 3 illustrates another embodiment of the present invention utilizing solar power. A solar array 110 is illustrated in communication with the flow control enclosure 8.

Like the previous embodiment, a body 9 can be mounted on a pedestal 76. The body 9 can have a top 50, a bottom 52 and walls 54a, 54b. The body can be enclosed by a movable mounted door 10. The movable door 10, which can include a seal 12 and a bottom seal 86 for providing a weather tight seal with the body 9. The movable door 10 can be secured shut with movable door fasteners 11a, 11b, 11c, 11d.

Like the previous embodiment, a bulkhead 13 can separate a top compartment 25 and a bottom compartment 26, with at least two batteries 27a, 27b disposed within bottom compartment 26. Batteries 27a, 27b, 27c, 27d are shown stored in the bottom compartment 26 and can fit into respective spaces formed by the separator 100 which can form up to about 8 spaces for about 8 batteries. The bottom compartment 26 can be sealed by bottom seal 86 on the movable door 10.

The top compartment 25 can include a back plane 24, which can be mounted to at least the bulkhead 13 within the top compartment 25 for supporting electronic equipment. A wireless communication unit 31 can be mounted to the back plane 24, wherein the wireless communication unit 31 can be in connection with the at least two batteries 27a, 27b.

The remote terminal unit 29, the wireless communication unit 31, and the input/output (I/O) termination assembly 30 can work in much the same way as described with respect to FIG. 1, such as for storing and transmitting data received from pieces of equipment in the field. The remote terminal unit 29 can be mounted to the back plane 24 and can be in communication with the wireless communication unit 31 and the at least two batteries.

The I/O termination assembly 30 can be mounted to the back plane 24, wherein the I/O termination assembly 30 can provide connections for at least one piece of field equipment to the remote terminal unit 29. The remote terminal unit 29 can be mounted on the back plane 24 and can communicate data to the wireless communication unit 31 for transmission via radio frequency.

A solar controller 112 can be in communication with a low voltage distribution block 38a, which can be mounted to the back plane 24. The low voltage distribution block 38a can receive power from a solar array 110 and can distribute power to a DC-DC converter 39, the batteries 27a, 27b, 27c, 27d and to a second low voltage distribution block 38b. The second low voltage distribution block 38b can power the remote terminal unit 29, the wireless communications unit 31, and the batteries 27a, 27b, 27c, 27d.

A DC-DC converter 39 can be mounted to the back plane 24 and can be connected to the low voltage distribution block 38a.

In an embodiment, a ground fault interrupter 56 can be in communication with the wireless communication unit 31.

In an embodiment, the solar array (110) can supply between about 10 volts to about 30 volts of power using photovoltaics. Photovoltaics is generally known as the field of technology and research related to the application of solar cells for energy by converting sunlight directly into electricity. This is extremely beneficial due to the growing demand for clean sources of energy and the manufacture of solar cells and photovoltaic arrays has expanded dramatically in recent years These embodiments provide a durable flow control enclosure, which further has an advantage in that no external source of power is required. The solar array generates enough power to operate the system.

In an embodiment, the remote terminal unit monitoring controller can have an indicator, which can be illuminating. In additional embodiments, the indicator can provide illuminations, sounds, visuals, or other means of providing an indication when the solar array is charging, when a load is disconnected or combinations thereof.

While these embodiments have been described with emphasis on the embodiments, it should be understood that within the scope of the appended claims, the embodiments might be practiced other than as specifically described herein.

What is claimed is:

1. A portable self contained weather resistant low voltage flow control system comprising:
   a. an enclosure comprising a body with a movable door;
   b. a bulkhead disposed in the body forming a top compartment and a bottom compartment;
   c. at least two batteries disposed within bottom compartment;
   d. a back plane mounted to at least the bulkhead within the top compartment for supporting electronic equipment;
   e. a wireless communications unit mounted to the back plane, wherein the wireless communication unit is in connection with the at least two batteries;
   f. a remote terminal unit mounted to the back plane in communication with the wireless communication unit and the at least two batteries;
   g. an input/output (I/O) termination assembly mounted to the back plane, wherein the I/O termination assembly provides connections for at least one piece of field equipment to the remote terminal unit;
   h. at least one uninterruptable power supply mounted to the back plane for providing between 10 volts to 30 volts of DC power to the at least two batteries;
   i. an A/C terminal assembly mounted to the back plane for receiving and distributing a continuous flow of A/C current from an external A/C power source to the at least one uninterruptable power supply;
   j. a surge protector mounted to the back plane for protecting the A/C terminal assembly from power surges from the A/C power source;
   k. a low voltage distribution block mounted to the back plane in communication with the at least one uninterruptable power supply;
   l. a DC-DC converter mounted to the back plane and connected to the low voltage distribution block; and
   m. at least two removable lifting eyes secured to the enclosure for lifting of the enclosure by a crane;
   n. at least one movable door fastener to secure the movable door to the enclosure, wherein the movable door comprises a door extension and wherein the door extension is adapted to house a remote terminal unit monitoring controller in communication with a flow controller in communication with the A/C terminal assembly and at least one piece of field equipment; and wherein the door extension has a viewing port in communication with the A/C terminal assembly and at least one piece of field equipment;
   wherein the flow control system provides 12 volts to 24 volts of continuous power to the remote terminal unit and the wireless communication unit while providing continuous communication for at least intermittent monitoring of field equipment.

2. The system of claim 1, wherein the wireless communication unit, remote terminal unit, I/O termination assembly, the uninterruptable power supply, the A/C terminal assembly, the surge protector, the low voltage distribution block and the converter disposed on the back plane are in a sealed watertight, water resistant top compartment.

3. The system of claim 1, wherein a seal is disposed in the bottom compartment forming a sealed watertight compartment for the at least 2 batteries and up to 8 batteries.

4. The system of claim 1, further comprising a ground fault interrupter disposed between the A/C terminal assembly and the uninterruptable power source.

5. The system of claim 1, further comprising a switch disposed between the A/C terminal assembly and the uninterruptable power source.

6. The system of claim 1, further comprising an outlet plug disposed between the A/C terminal assembly and the uninterruptable power source.

7. A portable self contained weather resistant low voltage flow control system comprising:
   a. at least two batteries;
   b. a wireless communications unit in communication with the at least two batteries;
   c. a remote terminal unit in communication with the wireless communication unit and the at least two batteries;
   d. an input/output (I/O) termination assembly providing connections for field equipment to the remote terminal unit;
   e. a remote terminal unit monitoring controller for monitoring and regulating a solar panel and for providing 10 volts to 30 volts of DC power to charge the at least two batteries;
   f. a solar array for receiving and distributing a continuous flow of electrical current to the remote terminal unit monitoring controller;
   g. a low voltage distribution block in communication with solar controller; and
   h. a DC-DC converter connected to the low voltage distribution block;

i. an enclosure comprising a body with a movable door, an A/C terminal assembly mounted in the enclosure, and at least one movable door fastener to secure the movable door to the enclosure, wherein the movable door comprises a door extension and wherein the door extension is adapted to house a remote terminal unit monitoring controller in communication with a flow controller in communication with the A/C terminal assembly and at least one piece of field equipment;

wherein the system provides continuous low voltage power to the remote terminal unit and the wireless communication unit to provide continuous communication for at least intermittent monitoring of field units.

8. The system of claim 7, wherein the solar array supplies between 10 volts to 30 volts of power using photovoltaics.

9. The system of claim 7, wherein the remoter terminal unit monitoring controller further comprises at least one volt meter for tracking voltage produced by the solar array.

10. The system of claim 9, wherein the remote terminal unit monitoring controller further comprises at least an indicator for illuminating when the solar array is charging, when a load is disconnected or combinations thereof.

* * * * *